United States Patent [19]
Davis, Jr.

[11] Patent Number: 5,539,323
[45] Date of Patent: Jul. 23, 1996

[54] SENSOR FOR ARTICLES SUCH AS WAFERS ON END EFFECTOR

[75] Inventor: James C. Davis, Jr., Carlisle, Mass.

[73] Assignee: Brooks Automation, Inc., Chelmsford, Mass.

[21] Appl. No.: 58,421

[22] Filed: May 7, 1993

[51] Int. Cl.⁶ .......................... G01R 27/26; G01N 27/00
[52] U.S. Cl. .................. 324/690; 331/65; 324/688; 324/663
[58] Field of Search ................... 324/660, 663, 324/687, 688, 690, 662, 511; 331/65; 73/304 C

[56]                References Cited

U.S. PATENT DOCUMENTS

| | | | |
|---|---|---|---|
| 3,626,287 | 12/1971 | Di Niro | 324/688 |
| 3,870,948 | 3/1975 | Holt | 331/65 |
| 3,883,826 | 5/1975 | Kirby | 331/65 |
| 4,067,225 | 1/1978 | Dorman et al. | 324/611 |
| 4,176,555 | 12/1979 | Dorman | 324/688 |
| 4,347,741 | 9/1982 | Gerger | 331/65 |
| 4,666,366 | 5/1987 | Davis | 414/749 |
| 4,743,837 | 5/1988 | Herzog | 324/688 |
| 4,763,063 | 8/1988 | Shkedi | 324/681 |
| 4,794,320 | 12/1988 | Chang | 324/681 |
| 4,909,701 | 3/1990 | Hardegen et al. | 414/749 |
| 4,918,376 | 4/1990 | Poduje et al. | 324/663 |
| 5,021,740 | 6/1991 | Sarr et al. | 324/688 |
| 5,045,797 | 9/1991 | Kramer et al. | 324/611 |
| 5,148,126 | 8/1992 | Spencer | 331/65 |
| 5,363,051 | 11/1994 | Jenstrom et al. | 324/688 |

Primary Examiner—Maura K. Regan
Attorney, Agent, or Firm—Nields & Lemack

[57]                ABSTRACT

The presence of an article at a specified location is detected by measuring a change in capacitance which is caused by the placement of the article at the specified location. The device used for this measurement includes an oscillator the frequency whereof is rendered highly sensitive to the capacitance being measured by structure which includes a triaxial cable and by electrical circuitry which includes a voltage follower circuit.

8 Claims, 3 Drawing Sheets

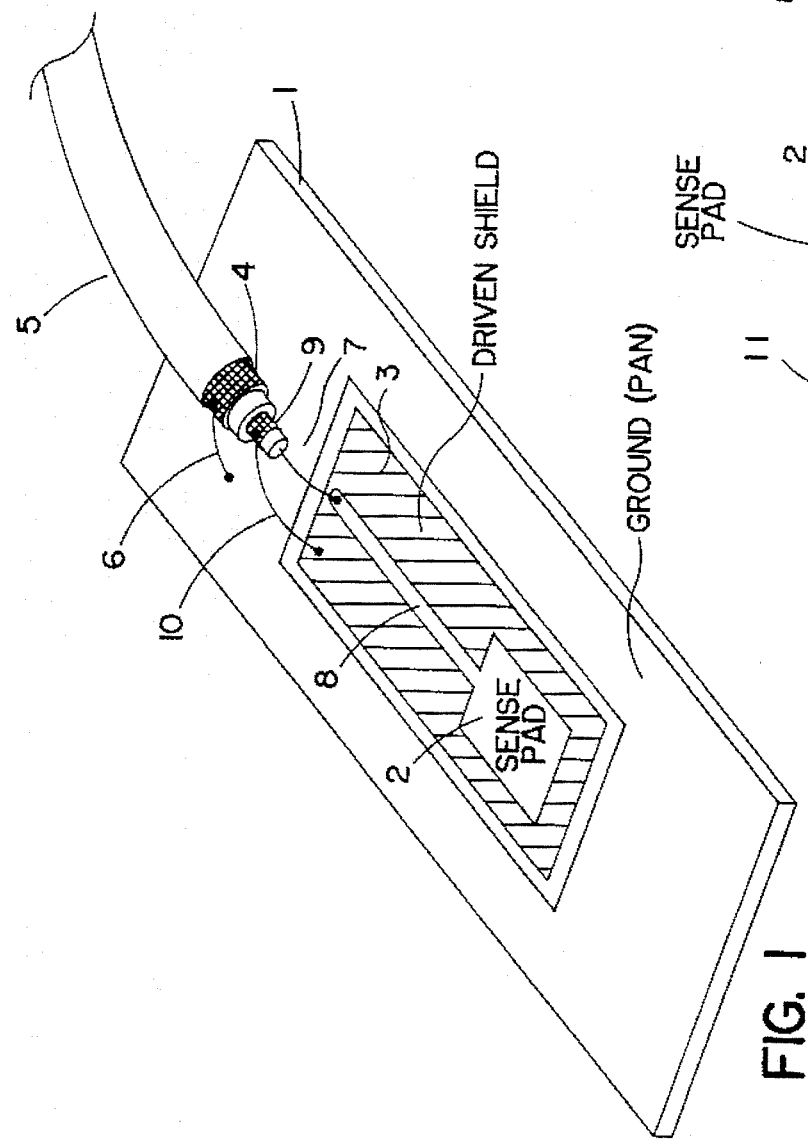
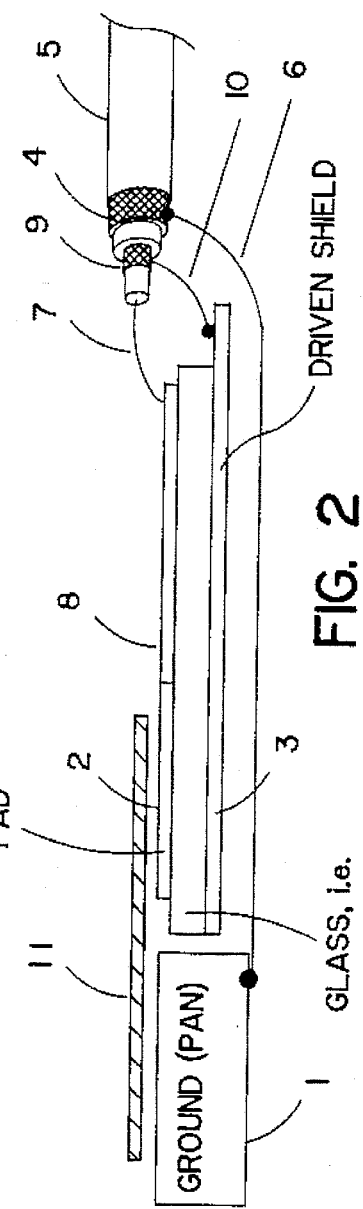

SENSOR FOR ARTICLES SUCH AS WAFERS ON END EFFECTOR

BACKGROUND OF THE INVENTION

1. Field of the Invention

The apparatus of the present invention relates generally to material transfer devices. The material transferred might include, but not be limited to, semiconductor wafers, such as silicon and Gallium Arsenide, semiconductor packaging substrates, such as High Density Interconnects, semiconductor manufacturing process imaging plates, such as masks or reticles, and large area display panels, such as Active Matrix LCD substrates.

2. Description of the Prior Art

The transfer of delicate silicon wafers or the like between a plurality of work stations or locations in the manufacture of semiconductor devices presents unique handling problems. Usually such transfer is performed by articulated arm transfer devices which operate within a vacuum environment which is remotely controlled. Consequently, it is important to be able to sense whether or not a wafer is present on the end effector of the transfer device. The silicon wafers are very delicate and have highly polished surfaces, and so it is desirable that the presence thereof be detected without contacting them.

There are numerous devices described in the prior art for transferring silicon wafers. For example:

U.S. Pat. Nos. 4,666,366 and 4,909,701 disclose wafer transfer handling apparatus having an articulated arm assembly which extends and retracts in a "froglike" motion to transfer an object such as a wafer between a plurality of locations.. Two articulated arms are operatively coupled such that when one arm is driven by a motor the articulated arms extend and retract in a "froglike" or "frogkick" type of motion. A platform is coupled to the arms and has the object to be transferred disposed thereon.

SUMMARY OF THE INVENTION

The present invention comprehends a device for detecting the presence of an article at a specified location by measuring a change in capacitance which is caused by the placement of the article at the specified location. The change in capacitance is measured by generating electrical oscillations in a circuit which includes the capacitance whose change is to be measured in such a manner that the change in capacitance causes a change in the frequency of the oscillations. The change in frequency is then converted to a change in voltage displayed by a voltage meter.

BRIEF DESCRIPTION OF THE DRAWINGS

FIG. 1 is an isometric view of the capacitance sensor of the invention, showing the positioning of the plates employed;

FIG. 2 is an edge view of the capacitance sensor of FIG. 1;

DETAILED DESCRIPTION OF THE INVENTION

Figure 3:
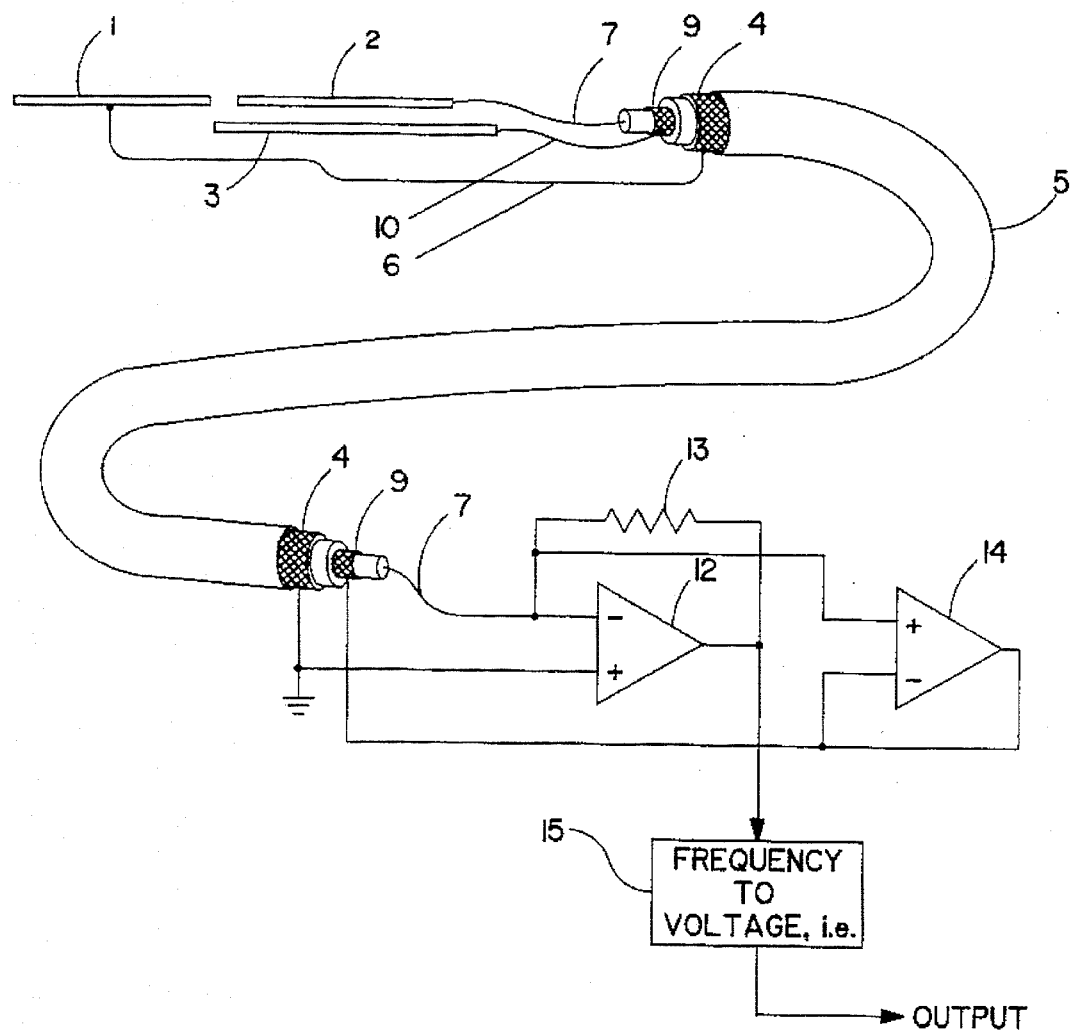
FIG. 3 is a circuit diagram showing the circuitry of the capacitance sensor of the invention and the triaxial cable which connects the plates of FIGS. 1 and 2 to the circuit elements.

The device of the invention is a capacitive sensor which is capable of non-contact sensing of a silicon wafer, a glass mask plate, or any other material which will change the capacity of two adjacent coplanar capacitor plates when brought into close proximity. The essential parts of the device are (1) an oscillator, the frequency of which is tuned by the sensor capacity, (2) a voltage follower of low output impedance, which drives (3) a triaxial cable comprising two shields and center conductor, and (4) a frequency-to-voltage converter or other appropriate output circuit.

Referring to FIGS. 1 and 2, the sensor of the invention includes a ground plate 1, a sensing plate 2 and a shield plate 3. The ground plate 1 is connected to the outer shield 4 of a triaxial cable 5 by a first lead 6. The sensing plate 2 is connected to the center conductor 7 of the triaxial cable 5 by a second lead 8. The shield plate 3 is connected to the inner shield 9 of the triaxial cable 5 by a third lead 10. The device 11 to be sensed, when present, is in close proximity to the groundplate 1 and the sensing plate 2. As shown in FIGS. 1 and 2, the ground plate 1 forms a support plate having an aperture and defining a plane upon which to support an article, such as a silicon wafer or a glass mask plate; the sensing plate 2 forms a sensor plate in said aperture close to but spaced below said plane, whereby a portion of the capacitance between said sensor plate and said support plate is created by the mutual geometry of said sensor plate and said support plate and whereby said capacitance is increased when an article is placed on said support plate; and the shield plate 3 forms a driven shield placed so as to shield said sensor plate from any other major capacitance between said sensor plate and said support plate.

The frequency of the oscillator of the invention is determined by a suitable resistor-capacitor (RC) circuit, and the circuitry of the oscillator and the voltage follower of the invention makes use of operational amplifiers (op-amps). Because resistor and capacitor components can be made to tight stability, because modern operational amplifiers provide broad-band high gain and low output impedance, and because a triaxial cable allows the driving of the inner shield thereof by a voltage follower into a fixed capacitance to the outer (ground) shield of the triaxial cable, the capacitance of the sensor head can be made a majority of the total tuning capacitance, and the frequency change with an approaching device to be sensed becomes large.

One embodiment of the circuitry of the invention is shown in FIG. 3, wherein bias networks, waveform shaping, and similar ancillary circuits are not shown. Referring thereto, a saw-tooth wave form is generated by an inverter circuit 12 having a resistive feedback 13 and an input capacitance to ground. The input capacitance, as in FIGS. 1 and 2, is formed by the sensing plate 2, which is connected to the op-amp input (i.e. the input of the inverter circuit 12), and the shield plate 3 is connected to the inner shield 9. The connections are: the center conductor 7 of the triaxial cable 5 is connected to the sensing plate 2 by the second lead 8, and the outer (ground) shield 4 of the triaxial cable 5 is connected to the ground plate 1 and to the a-c ground of the op-amp. The inner shield 9 of the triaxial cable 5 may be extended to shield the sensing plate 2 from ground.

As shown in FIG. 3, the inverter circuit 12 of FIG. 3, having said resistive feedback 13 and said input capacitance to ground, forms an oscillator having an input connected to said sensor plate and having a frequency which is a function of said capacitance.

It is the inner shield 9 which cancels the cable capacitance by being driven by a voltage follower 14. While the capacitance of the cable from inner shield to center conductor may be tens of picofarads, if, because of the voltage-follower, there is no voltage difference between the two conductors, there will also be no current, and the effect will be negligible on the oscillation which is at a high impedance node. Simultaneously the capacitance of the inner shield to the outer shield will be driven by the low impedance of the voltage follower and the current required will not significantly distort the inner shield voltage waveform.

As shown in FIG. 3, the inner shield 9, being connected to said shield plate or driven shield 3, and being driven by said voltage follower 14, forms means for nullifying the voltage between said driven shield 3 and said sensor plate or sensing plate 2 during the oscillations.

Thus, because all the cable capacitive current is supplied by a source outside the oscillator current loop, all the oscillator current will be conducted through the impedance of the sensor plates, causing a large change in frequency with sensor capacitance changes. As a result, the circuit is essentially immune to ground loops, lead dress and other non-circuit-related variables which otherwise would distort and decrease the desired signal.

The frequency of the oscillations generated by the inverter circuit 12, which frequency is a measure of the capacitance being sensed, appears at the output of the inverter circuit 12, which is connected to the input of a standard frequency-to-voltage converter 15, the output whereof may then be displayed by a voltage meter.

Figure 4:
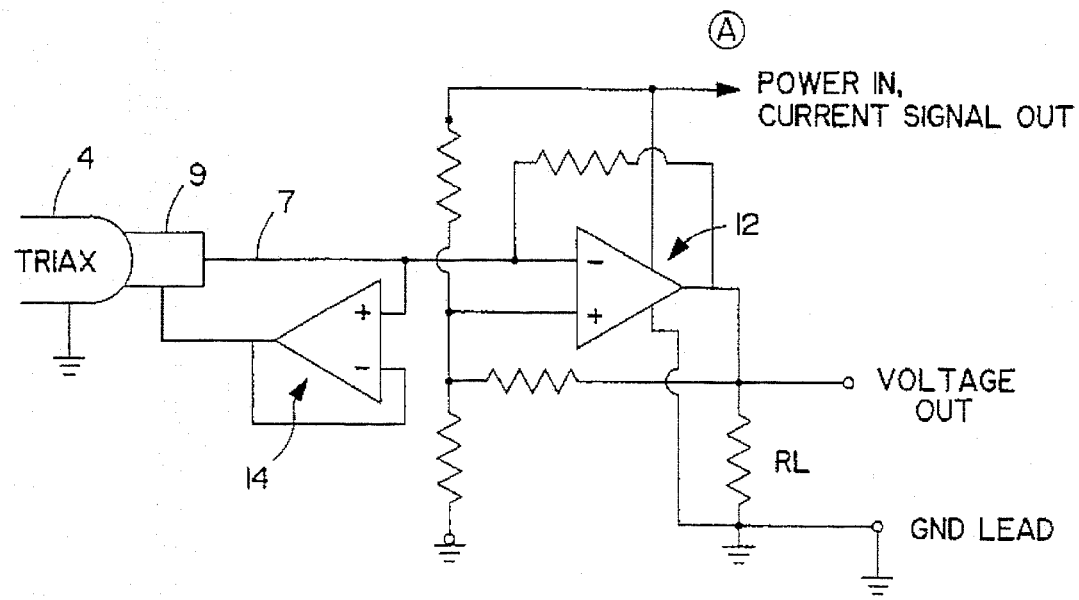
FIGS. 4 and 5 constitute a circuit diagram showing a circuit alternate to that of FIG. 3, wherein the "front end" oscillator circuit shown in FIG. 4 is essentially the same as that of FIG. 3, and the circuit shown in FIG. 5 acts as a signal conditioner.
Figure 5:
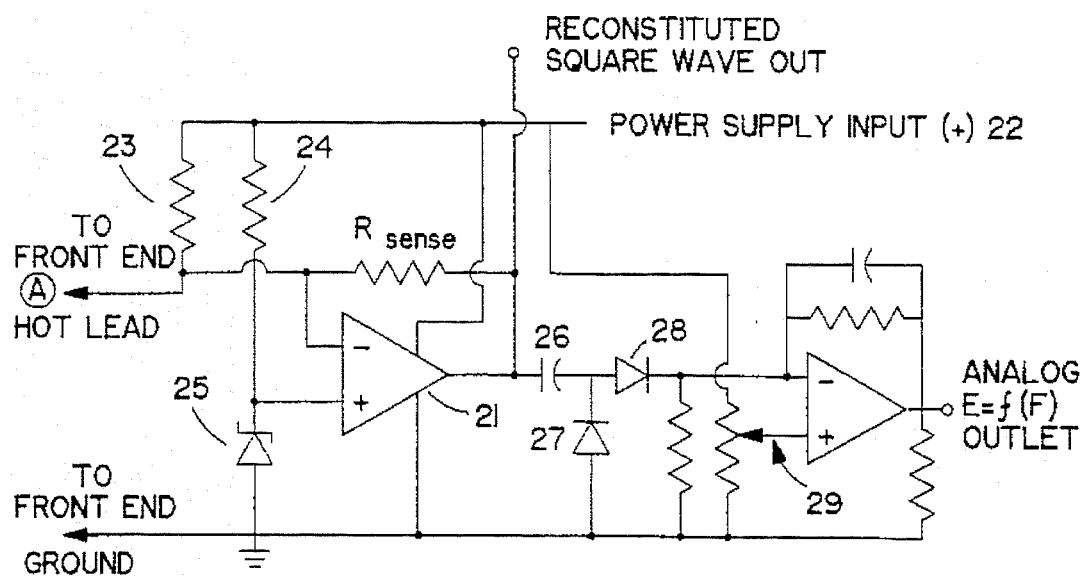

As shown in FIG. 3 through 5, said standard frequency-to-voltage converter 15 and said voltage meter form means for measuring said frequency.

In the apparatus which has just been described, the circuitry, sensor, and triaxial cable shown in FIG. 3 may all be within the vacuum chamber which encloses the end effector. If so, in addition to the ground lead, two conductors are required which must pass through the wall of the vacuum chamber: one is the conductor for the power delivered to the oscillator and voltage follower, and the other is the conductor for the square-wave voltage output which is delivered to the frequency-to-voltage converter. The number of conductors thus required may be reduced to one by means of a circuit such as the signal conditioner shown in FIG. 5, which replaces the frequency-to-voltage converter 15 shown in FIG. 3. In addition, the rest of the circuit of FIG. 3 (which may be designated a "front end" oscillator) is slightly modified as shown in FIG. 4.

Referring to FIG. 5, the signal conditioner therein shown includes an input op-amp 21 the minus input whereof receives a current signal and the output whereof delivers a reconstituted square-wave voltage. Power input 22 from a suitable power supply is delivered to the hot lead A of the front-end oscillator via a resistor 23. The power input 22 is connected to ground through a resistor 24 and a zener voltage-reference diode 25 operating in the zener mode at a voltage of, e.g. 3 volts, and the plus input of the input op-amp 21 is connected to the junction of the resistor 24 and zener diode 25. The power for the op-amp 21 is provided by the power supply input 22. A feedback resistor $R_{sense}$ is connected between the output and the minus input of the input op-amp 21. The ground of the signal conditioner of FIG. 5 is connected to the ground of the "front end" oscillator of FIG. 4.

Referring now to FIGS. 4 and 5, the square wave voltage oscillation drives the load resistor $R_L$ and this signal may be used directly, as hereinbefore described, as the input to a frequency-to-voltage converter such as that shown at 15 in FIG. 3. Alternatively, when the signal on $R_L$ is high (typically 5 volts), the load current will be larger (5 mA if $R_L$=one kilohm) than when the output signal on $R_L$ is low (typically 0 volts). The current through the load resistor is provided by the power input, such that the current provided by the power supply through the signal conditioner will be, typically, 5 ma greater for a "high" half-wave of oscillation than for a "low" half-wave.

The input circuit of the conditioner will sense the change and the input op-amp 21 will generate a current through $R_{sense}$ to keep the op amp minus input at virtual ground. The voltage ($\Delta I$ times $R_{sense}$) is the reconstituted oscillation.

The capacitor 26 and two diodes 27,28 will convert the oscillation to a voltage proportional to the frequency E=kf. The potentiometer 29 allows threshold setting for switching outputs. Alternate circuits will give an analog output.

More specifically, the current through the resistor 23 remains at the average current delivered to the "front end" oscillator of FIG. 4 from the power supply input 22 of the signal conditioner of FIG. 5. Any tendency for this current to change as a result of the aforementioned changes in the current through the load resistor $R_L$ will result in a tendency for the voltage at the minus input to the op-amp 21 to change. However, the latter tendency is immediately corrected by the feedback of the op-amp 21 through the resistor $R_{sense}$. As a result, any change in current through the load resistor $R_L$ appears as a change in current through the feedback resistor $R_{sense}$, while the current through the resistor 23 remains the average current from the power supply input 22. In order to cause this change in current through the feedback resistor $R_{sense}$ the output voltage of the op-amp 21 must change in such a way as to reconsititute the original square wave voltage output from the op-amp 12 of FIG. 4. This voltage output is converted to a pulse by the capacitance 26, which thus acts as a differentiator. When the square wave voltage output rises from low to high, a positive pulse travels through the diode 28 to the minus input of the op-amp 30, which acts as an integrating amplifier. The resulting negative feedback pulse charges the feedback capacitance 31. When the square wave voltage output from op-amp 21 falls from high to low, the charged capacitance 26 discharges through the diode 27. The charge temporarily stored in the capacitance 31 is constantly bled off through the resistor 32, and the amount of this current is proportional to the frequency with which the capacitance 31 is charged. Thus the voltage output of the op-amp 30 is proportional to the frequency of the square-wave signal, and the op-amp acts as an integrating amplifier.

By means of the signal conditioner of FIG. 5, in the oscillator a conversion of the signal to a varying current on the power lead allows penetration of a cabinet, vacuum chamber, etc., with only one lead other than chassis ground, and so simplifies the problems of leads on robot arms, seals in chamber walls, etc. A circuit in the signal conditioner converts the varying current into a voltage wave replicating the original oscillation of the front end circuit. A further circuit converts the frequency square wave into an analog voltage proportional to the frequency or to an on/off switch signal.

Having thus described the principles of the invention, together with illustrative embodiments thereof, it is to be understood that although specific terms are employed, they are used in a generic and descriptive sense and not for purposes of limitation, the scope of the invention being set forth in the following claims.

I claim:

1. A system for sensing close proximity of an article such as a wafer comprising in combination two adjacent capacitor plates having substantially coplanar surfaces, said capacitor plates including a ground plate and a sensor plate which forms a capacitance with respect to said ground plate which is essentially zero until it increases greatly as an article approaches in substantially the same close proximity to said surfaces of both said plates, whereby sensitivity of the system to the close proximity of an article is enhanced, an oscillator having an input connected to said sensor plate and having a frequency which varies as said capacitance varies, whereby said frequency indicates the magnitude of said capacitance, whereby said frequency indicates close proximity of an article to said surfaces of both said plates, a substantial length of triaxial cable having a center conductor connected to said sensor plate, an inner shield and an outer shield connected to said ground plate, a voltage follower circuit connected to drive said inner shield from said center conductor, and signal conditioning circuits to convert the frequency of said oscillator to an analog or digital output signal which indicates the magnitude of said capacitance.

2. A sensor system in accordance with claim 1, wherein said oscillator is an R-C triangular wave source, wherein said voltage follower drives said inner shield with a voltage of small difference from that of the oscillator signal driving said center conductor, and wherein said outer shield is grounded.

3. A sensor system in accordance with claim 1, wherein the sensed capacitance, which forms the capacitance of the R-C oscillator, is the capacitance between the center conductor-driven plate and the grounded plate as coupled by the object to be sensed when in close proximity to both plates.

4. A sensor system in accordance with claim 1, wherein said signal conditioning circuits include frequency-to-voltage circuits or digital frequency-counter circuits, and wherein the analog or digital output is either used directly by subsequent computational circuits or converted to a yes-no type signal for switch activation.

5. A device for detecting close proximity of an article such as a wafer to a capacitor plate by producing a signal having a frequency which varies as the capacitance between said article and said capacitor plate varies, whereby said signal indicates the magnitude of said capacitance and hence close proximity of said article to said capacitor plate, comprising in combination a capacitive ground plate having an aperture and defining a first surface near which to place the article, a sensor plate 2 in said aperture close to but insulated from said ground plate and having a second surface co-extensive with said first surface, whereby a portion of the capacitance between said sensor plate and said ground plate is created by the mutual geometry of said sensor plate and said ground plate and whereby said capacitance is essentially zero until it is increased greatly when an article comes in substantially the same close proximity to both said first and second surfaces whereby sensitivity of the device to the close proximity of an article is enhanced, a driven shield 3 placed so as to shield said sensor plate from any other major capacitance between said sensor plate and said ground plate, an oscillator 12,13,2,1 having an input connected to said sensor plate and having a frequency which varies as said capacitance varies, whereby said frequency indicates the magnitude of said capacitance, means 3,9,14 for nullifying the voltage between said shield and said sensor plate during the oscillations, and means for measuring said frequency, whereby said presence of said article is detected.

6. A sensor system in accordance with claim 5, wherein said means for measuring said frequency comprises a circuit adapted to convert the oscillator voltage signal to a varying current on the power lead to said oscillator and wherein said power lead delivers the thus-converted oscillator signal to a signal conditioning circuit.

7. A sensor system in accordance with claim 6, wherein said signal conditioning circuit is adapted to convert said varying current into a voltage wave replicating the original oscillation of said oscillator.

8. A sensor system in accordance with claim 7, wherein said signal conditioning circuit is adapted to convert said voltage wave into an analog voltage proportional to the frequency or to an on/off switch signal.

* * * * *